(12) United States Patent
Fox

(10) Patent No.: US 11,776,001 B2
(45) Date of Patent: *Oct. 3, 2023

(54) SYSTEM AND METHOD FOR ENHANCED ORDERING USING INCENTIVES AND LOCATION BASED DELIVERY POINTS

(71) Applicant: Blue Baker, LLC, College Station, TX (US)

(72) Inventor: David C. Fox, College Station, TX (US)

(73) Assignee: Blue Baker, LLC, College Station, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/081,206

(22) Filed: Dec. 14, 2022

(65) Prior Publication Data

US 2023/0110551 A1    Apr. 13, 2023

Related U.S. Application Data

(63) Continuation-in-part of application No. 17/532,077, filed on Nov. 22, 2021, which is a
(Continued)

(51) Int. Cl.
*G06Q 30/0207*    (2023.01)
*G06Q 30/0235*    (2023.01)
(Continued)

(52) U.S. Cl.
CPC ....... *G06Q 30/0224* (2013.01); *G06Q 10/083* (2013.01); *G06Q 30/0235* (2013.01)

(58) Field of Classification Search
CPC ............ G06Q 30/0224; G06Q 10/083; G06Q 30/0235; G06Q 30/0635; G06Q 30/0641; G06Q 50/12; G06Q 30/0621
(Continued)

(56) References Cited

U.S. PATENT DOCUMENTS 5,969,968 A    10/1999    Pentel
6,366,220 B1    4/2002    Pentel
(Continued)

FOREIGN PATENT DOCUMENTS

CN    103745266 A    4/2014
DE    10338155 A1    7/2004
(Continued)

*Primary Examiner* — Garcia Ade
(74) *Attorney, Agent, or Firm* — Dickinson Wright, PLLC; Stephen A. Mason; Jonathan H. Harder

(57) ABSTRACT

A computer-implemented method for incentivizing logistically convenient delivery orders is disclosed. The method includes monitoring, by a computing device, delivery orders of users which include a pick-up location, a drop-off location, an estimated time of pick-up, and an estimated time of drop-off. The method further includes determining, based on the monitoring of delivery orders, a trending drop-off location and a trending drop-off time. The method further includes determining, based on the trending drop-off location, the trending drop-off time, and a current location of the users, a subset of users. The method further includes sending to the subset of users an incentive to place a delivery order.

20 Claims, 6 Drawing Sheets

Related U.S. Application Data continuation-in-part of application No. 16/504,123, filed on Jul. 5, 2019, now Pat. No. 11,182,864, which is a continuation-in-part of application No. 15/168,952, filed on May 31, 2016, now Pat. No. 10,402,920.

(60) Provisional application No. 62/191,772, filed on Jul. 13, 2015.

(51) Int. Cl.
*G06Q 10/083* (2023.01)
*G06Q 20/18* (2012.01)

(58) Field of Classification Search
USPC .......................................................... 705/15
See application file for complete search history.

(56) References Cited

U.S. PATENT DOCUMENTS

| | | |
|---|---|---|
| 6,425,524 B2 | 7/2002 | Pentel |
| 6,585,516 B1 | 7/2003 | Alabaster |
| 6,940,393 B2 | 9/2005 | Dev et al. |
| 7,895,797 B2 | 3/2011 | Bridgman et al. |
| 7,992,355 B2 | 8/2011 | Bridgman et al. |
| 8,059,029 B2 | 11/2011 | Juang |
| 8,190,483 B2 | 5/2012 | Woycik et al. |
| 8,280,775 B2 | 10/2012 | Armstong |
| 8,650,095 B1 | 2/2014 | Shimoff et al. |
| 8,660,906 B2 | 2/2014 | Woycik et al. |
| 2002/0138350 A1 | 9/2002 | Cogen |
| 2003/0046166 A1 | 3/2003 | Liebman |
| 2005/0108097 A1 | 5/2005 | McAleenan |
| 2006/0006025 A1 | 1/2006 | Dev et al. |
| 2006/0085266 A1 | 4/2006 | Wei et al. |
| 2006/0218043 A1 | 9/2006 | Rosenzweig et al. |
| 2006/0293971 A1 | 12/2006 | Hunter et al. |
| 2007/0061209 A1 | 3/2007 | Jackson |
| 2009/0204492 A1 | 8/2009 | Scifo et al. |
| 2009/0319381 A1 | 12/2009 | Armstrong |
| 2010/0106607 A1 | 4/2010 | Riddiford et al. |
| 2012/0209730 A1 | 8/2012 | Garrett |
| 2013/0024299 A1 | 1/2013 | Wong et al. |
| 2014/0100971 A1* | 4/2014 | Klearman ............... G06Q 50/12 |
| | | 705/15 |
| 2016/0244311 A1* | 8/2016 | Burks .................... G06Q 20/18 |

FOREIGN PATENT DOCUMENTS

| | | |
|---|---|---|
| EP | 2102801 A1 | 9/2009 |
| WO | 1999054808 A1 | 10/1999 |
| WO | 2009126266 A3 | 10/2009 |

\* cited by examiner

SYSTEM AND METHOD FOR ENHANCED ORDERING USING INCENTIVES AND LOCATION BASED DELIVERY POINTS

CROSS-REFERENCES TO RELATED APPLICATIONS

This application is a continuation-in-part of patent application Ser. No. 17/532,077 filed Nov. 22, 2021, which is a continuation of patent application Ser. No. 16/504,123 filed Jul. 5, 2019, which is a continuation-in-part of patent application Ser. No. 15/168,952 filed May 31, 2016, which claims the benefit of Provisional Patent Application Ser. No. 62/191,772 filed Jul. 13, 2015, and the contents and disclosures of all applications are incorporated herein by reference in their entirety for all purposes.

BACKGROUND

On demand food delivery is a means by which food service establishment may sell cooked food items to customers not physically present in their place of business. Customers may, from the comfort of their homes, place an order for a menu item and await delivery. In this manner, a customer enjoys a meal in the privacy of their home while a food service establishment enjoys a larger customer base without the added overhead of a larger retail footprint.

Each food service company establishment being responsible for their own order processing and delivery infrastructure. Such overlapping of delivery services for food service establishments in a similar area is expensive and inefficient.

SUMMARY

In one embodiment, a computer-implemented method is disclosed. The method for incentivizing logistically convenient delivery orders includes monitoring, by a computing device, delivery orders of users which include a pick-up location, a drop-off location, an estimated time of pick-up, and an estimated time of drop-off. The method further includes determining, based on the monitoring of delivery orders, a trending drop-off location and a trending drop-off time. The method further includes determining, based on the trending drop-off location, the trending drop-off time, and a current location of the users, a subset of users. The method further includes sending to the subset of users an incentive to place a delivery order.

In some embodiments, the method may further include the subset of users being selected from the users based in part on a location of the user being similar to the trending drop-off location. The method may further include the subset of users being selected from the users based in part on previous delivery history of a user indicating an affinity for an order from a trending pick-up location. The method may further include the subset of users being selected from the users based in part on an incentive acceptance history. The method may further include the incentive to place a delivery order for each of the subset of users being related to a unique code available to a specific user and available for a predetermined amount of time. The method may further include the estimated time of drop-off being determined based in part on a previous delivery history related to a previous trending drop-off time history and the estimated time of pick-up is determined based in part on the previous delivery history related to the previous trending pick-up time history. The method may further include receiving, from at least two users of the subset of users, an order from each user, generating, based on the two or more orders, a merged order. The method may further include an order comprising a drop-off location, a menu selection, and an associated user; and wherein the merged order comprises one drop-off location, at least two menu selections, and at least two associated users.

In one embodiment, a computer-implemented system is disclosed. The system for incentivizing logistically convenient delivery orders includes monitoring, by a computing device, delivery orders of users which include a pick-up location, a drop-off location, an estimated time of pick-up, and an estimated time of drop-off. The system further includes determining, based on the monitoring of delivery orders, a trending drop-off location and a trending drop-off time. The system further includes determining, based on the trending drop-off location, the trending drop-off time, and a current location of the users, a subset of users. The system further includes sending to the subset of users an incentive to place a delivery order.

In one embodiment, a computer-readable medium is disclosed. The computer-readable medium include instructions for incentivizing logistically convenient delivery orders includes monitoring, by a computing device, delivery orders of users which include a pick-up location, a drop-off location, an estimated time of pick-up, and an estimated time of drop-off. The computer-readable medium further includes instructions for determining, based on the monitoring of delivery orders, a trending drop-off location and a trending drop-off time. The computer-readable medium further includes instructions for determining, based on the trending drop-off location, the trending drop-off time, and a current location of the users, a subset of users. The computer-readable medium further includes instructions for sending to the subset of users an incentive to place a delivery order.

Another aspect of the disclosed embodiments includes a system that includes a processing device and a memory communicatively coupled to the processing device and capable of storing instructions. The processing device executes the instructions to perform any of the methods, operations, or steps described herein.

Another aspect of the disclosed embodiments includes a tangible, non-transitory computer-readable medium storing instructions that, when executed, cause a processing device to perform any of the methods, operations, or steps disclosed herein.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

For a detailed description of example embodiments, reference will now be made to the accompanying drawings in which.

NOTATION AND NOMENCLATURE

Figure 1:
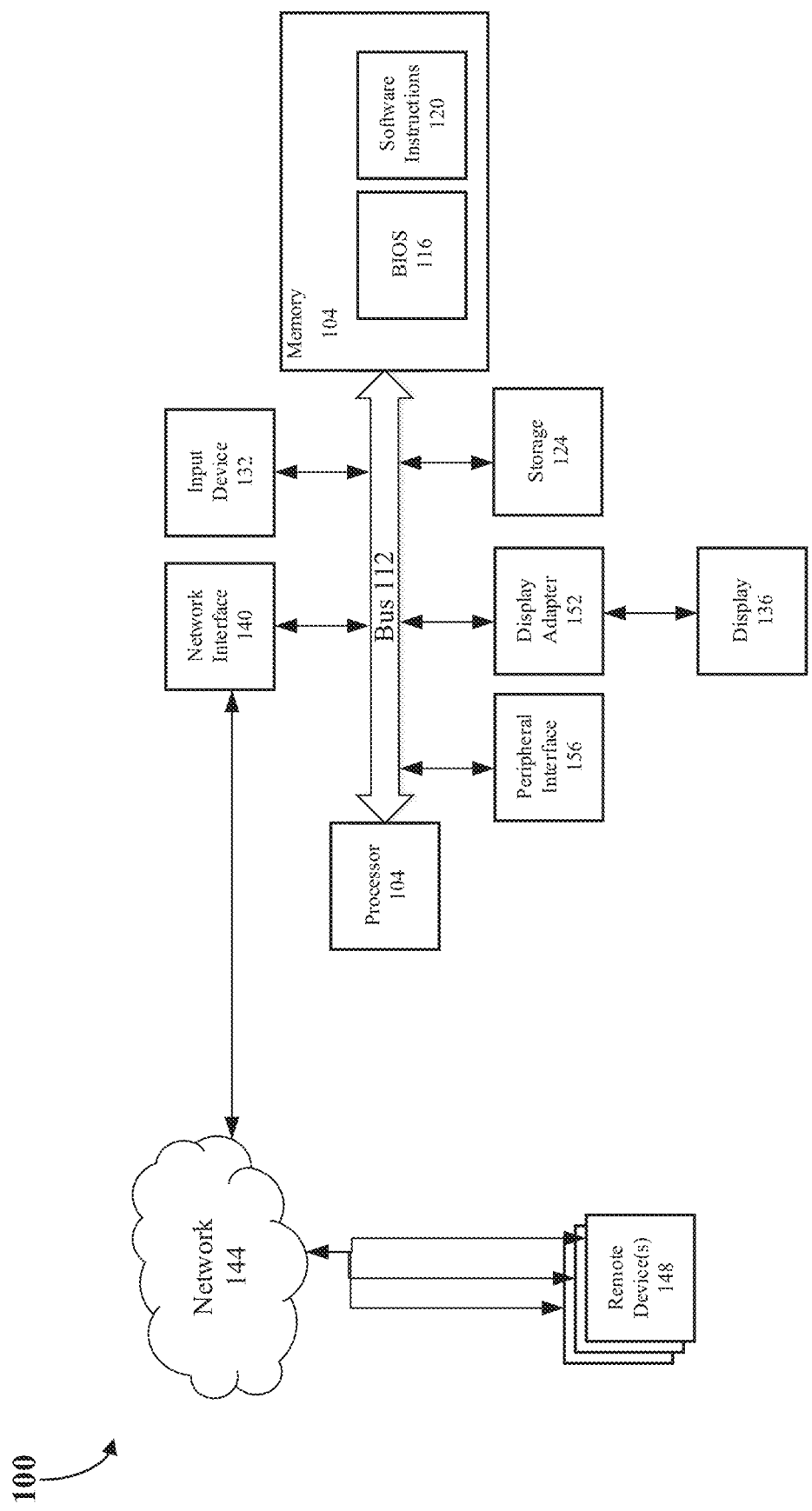
FIG. 1 generally illustrates a computer-implemented system according to the principles of the present disclosure.

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer, or section from another region, layer, or section. Terms such as "first," "second," and other numerical terms, when used herein, do not imply a sequence or order unless clearly indicated by the context. Thus, a first element, component, region, layer, or section discussed below could be termed a second element, component, region, layer, or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "upper," "top," "bottom," "inside," "outside," "contained within," "superimposing upon," and the like, may be used herein. These spatially relative terms can be used for ease of description to describe one element's or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

DETAILED DESCRIPTION

The following discussion is directed to various embodiments of the present disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As is generally illustrated in FIG. 1 a computing system 100 that can perform any one or more of the methods described herein, in accordance with one or more aspects of the present disclosure. Computing system 100 includes a processor 104 and a memory 108 that communicate with each other, and with other components, via a bus 112. The processor 104 may be a single core processor, a multi core processor, or a network of processors working together. Bus 112 may include any of several types of bus structures including, but not limited to, a memory bus, a memory controller, a peripheral bus, a local bus, and any combinations thereof, using any of a variety of bus architectures.

Memory 108 may include various components (e.g., machine-readable media) including, but not limited to, a random-access memory component, a read-only component, and any combinations thereof. In one example, a basic input/output system 116 (BIOS), including basic routines that help to transfer information between elements within computing system 100, such as during start-up, may be stored in memory 108. Memory 108 may also include (e.g., stored on one or more machine-readable media) instructions 120 (e.g., software) embodying any one or more of the aspects and/or methodologies of the present disclosure. In another example, memory 108 may further include any number of program modules including, but not limited to, an operating system, one or more application programs, other program modules, program data, and any combinations thereof.

Computing system 100 my also include a storage device 124. Examples of a storage device (e.g., storage device 124) include, but are not limited to, a hard disk drive, a magnetic disk drive, an optical disc drive in combination with an optical medium, a solid-state memory device, and any combinations thereof. Storage device 124 may be connected to bus 112 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 124 (or one or more components thereof) may be removably interfaced with computing system 100 (e.g., via an external port connector (not shown)). Particularly, storage device 124 and an associated machine-readable medium 128 may provide nonvolatile and/or volatile storage of machine-readable instructions, data structures, program modules, and/or other data for computing system 100. In one example, instructions 120 may reside, completely or partially, within machine-readable medium 128. In another example, instructions 120 may reside, completely or partially, within processor 104.

Computing system 100 may also include an input device 132. In one example, a user of computing system 100 may enter commands and/or other information into computing system 100 via input device 132. Examples of an input device 132 includes, but are not limited to, an alphanumeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof Input device 132 may be interfaced to bus 112 via any of a variety of interfaces (not shown) including, but not limited to, a serial interface, a parallel interface, a game port, a USB interface, a FIREWIRE interface, a direct interface to bus 112, and any combinations thereof. Input device 132 may include a touch screen interface that may be a part of or separate from display device 136, discussed further below. Input device 132 may be utilized as a user selection device for selecting one or more graphical representations in a graphical interface as described above.

A user may also input commands and/or other information to computing system 100 via storage device 124 (e.g., a removable disk drive, a flash drive, etc.) and/or network interface device 140. A network interface device, such as network interface device 140, may be utilized for connecting computing system 100 to one or more of a variety of networks, such as network 144, and one or more remote devices 148 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. Remote devices 148 may further include third party servers 222, remote devices 148, and restaurant servers 226.

A network, such as network 144, may employ a wired and/or a wireless mode of communication. In general, any network topology may be used. Information (e.g., data, instructions 120, etc.) may be communicated to and/or from computing system 100 via network interface device 140.

Computing system 100 may further include a video display adapter 152 for communicating a displayable image to a display device, such as display device 136. Examples of a display device include, but are not limited to, a liquid crystal display (LCD), a cathode ray tube (CRT), a plasma display, a light emitting diode (LED) display, and any combinations thereof. Video display adapter 152 and display device 136 may be utilized in combination with processor 104 to provide graphical representations of aspects of the present disclosure. In addition to a display device, computing system 100 may include one or more other peripheral output devices including, but not limited to, an audio speaker, a printer, and any combinations thereof. Such peripheral output devices may be connected to bus 112 via a peripheral interface 156. Examples of a peripheral interface include, but are not limited to, a serial port, a USB connection, a FIREWIRE connection, a parallel connection, and any combinations thereof.

Figure 2:
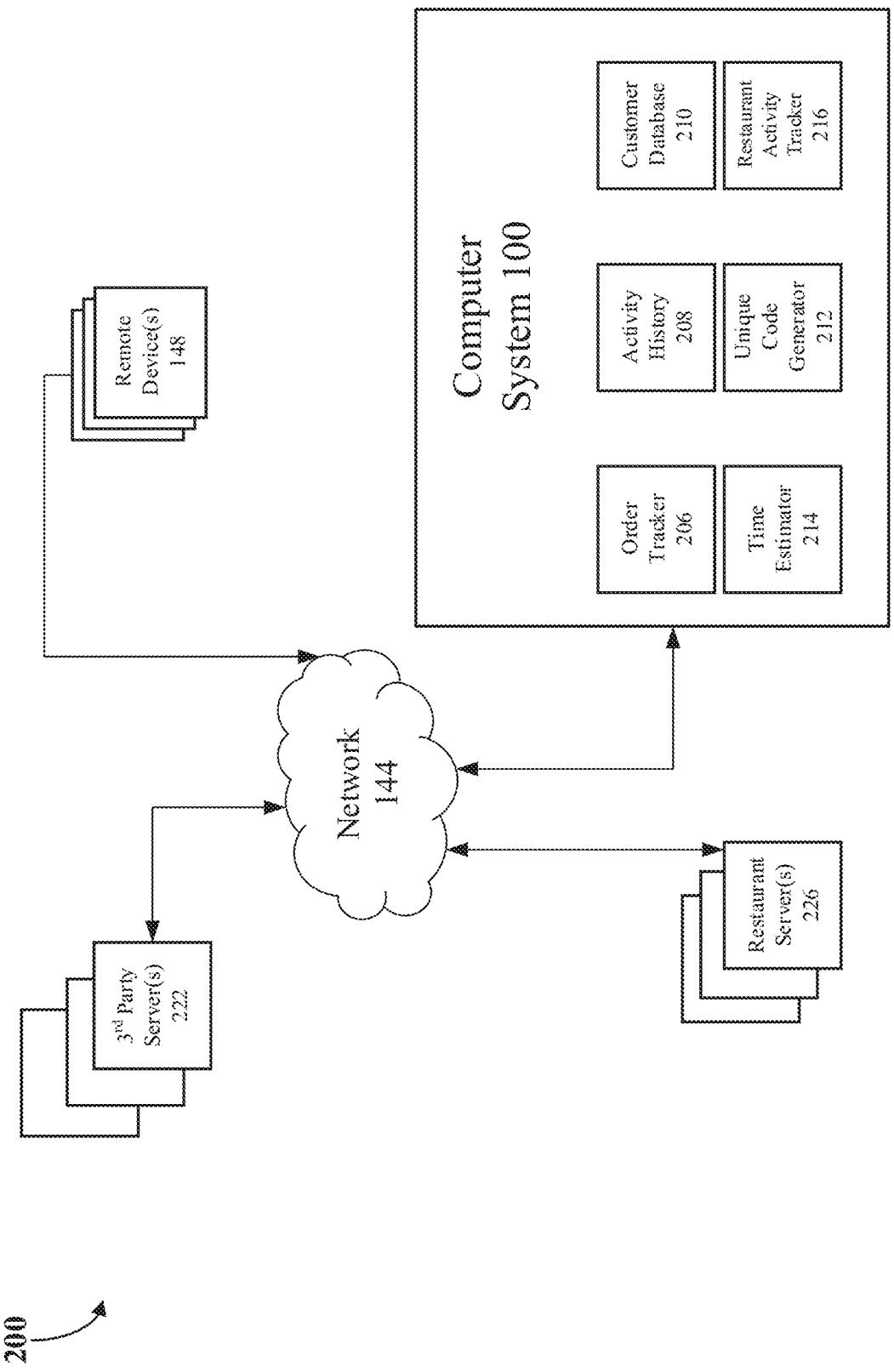
FIG. 2 generally illustrates a block diagram of an embodiment of the computer-implemented system according to the principles of the present disclosure.

As is generally illustrated in FIG. 2 a computing environment in accordance with one or more aspects of the present disclosure. Computing environment 200 may include computing system 100 which further comprises order tracker 206, activity history 208, customer database 210, time estimator 214, unique code generator 212, and restaurant activity tracker 216. In some embodiments, the activity history 208 may track all orders received via the network 144 and generate records regarding which user submitted the order, what is the pick-up location, what is the drop-off location, what time was the order received, and the like.

In some embodiments, the activity history 208 may store order activity records generated by the order tracker 206. In some embodiments, the customer database 210 may include records of all users registered by the system, the account information of each registered user, and the activity of each registered user. The time estimator 214 may predict when an order may be picked-up from the food service establishment or dropped-off to the drop-off location associated with the user.

In some embodiments, the computing system 100 may connect to the network 144 via network interface device 140 and communicate with remote devices 148, third party servers 222, restaurant servers 226, and any other computer connected to the network 144. In some embodiments, the remote devices 148 may be mobile devices of users, cooking staff, drivers, system administrators, and any other party associated with the system. In some embodiments, the restaurant servers 226 may include computing devices associated with a specific location of a food service establishment. Many food service establishments may utilize the system and each location may have a dedicated server. In some embodiments, functionality described as being performed by the computing system 100 may be performed by third party servers 222, restaurant servers 226, or any combination thereof.

In some embodiments, the computing system 100 may connect to third party servers 222 which may be associated with third party services. For example, a third party server 222 may be associated with a mapping service which provides routes, traffic conditions, construction notices, and the like. The computing system 100 may receive from the third party server any relevant mapping information and use it when predicting pick-up and drop-off times. Other third party services that may be provided by the third party servers 222 may include, but are not limited to, traffic, routes, construction, weather, natural disasters, amount of activity at food service establishments, popularity of specific products, discount offers from food service establishments, and the like.

Figure 3:
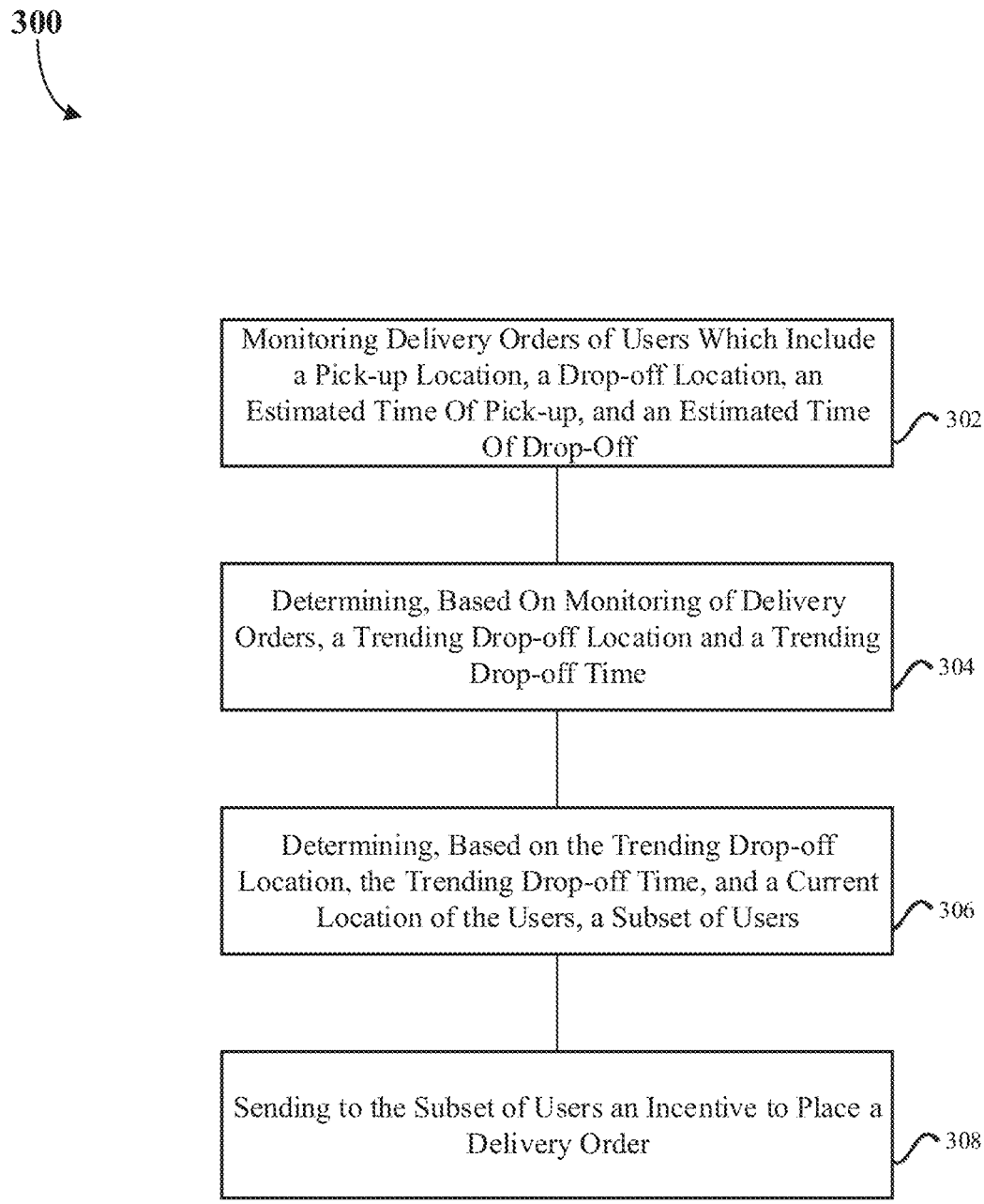
FIG. 3 generally illustrates a flow chart representing the method for receiving and processing orders from users according to the principles of the present disclosure.

FIG. 3 generally illustrates an example embodiments of a method 300 for receiving and processing orders from users according to the principles of the present disclosure. In some embodiments the method 300 may be executed by the processor 104. In some embodiments, instructions to execute the method 300 may be stored in the storage device 124 of the computing system 100. User input may be accepted from the input device 132. In certain implementations, the method 300 may be performed by a single processing thread. Alternatively, the method 300 may be performed by two or more processing threads, each thread implementing one or more individual functions, routines, subroutines, or operations of the methods.

At block 302, the computing system 100 monitors the delivery orders of users. In some embodiments, the order may comprise a pick-up location, a drop-off location, and an estimated time of pick-up, an estimated time of drop-off, and a menu selection. In some embodiments, the user may submit an order on one of the remote devices 148 via a web site, an application, a text message, a voice chat interface, an email, or any suitable manner of entering an order. In some embodiments, the order may be tracked by order tracker 206. In some embodiments, information related to the order may be stored by the activity history 208 and the customer database 210.

At block 304, the computing system 100 may determine a trending drop-off location and a trending drop-off location. In some embodiments, the computing system 100 may determine the trending drop-off and pick-up locations based on monitoring of orders by the order tracker 206. For example, the computing system 100 may generate a score predicting the likelihood that a location may be a trending pick-up location or drop-off location. An order from a pick-up location may increase the score predicting the likelihood that the location may be a trending location. The number of orders and the rate at which orders are received may be compared to threshold of orders received within a predetermined amount of time. In some embodiments, the threshold of received orders and the predetermined amount of time may be determined based on historical trends and inputs from system administrators.

In some embodiments, the trending drop-off location may be an apartment building, a dormitory, a banquet hall, a multipurpose space, a convention center, a conference room, or a location intended to be used for a food service pick-up location. For example, if a trending number of orders arrive within a predetermined time and at a predetermined rate, a dormitory may be a trending drop-off location. The food service orders of the customers may be dropped off at the trending drop-off location and picked up by the requisite users. In another example, a trending drop-off location may be the property of a third party with whom a license may exist allowing their property to be used as a trending drop-off location. In some embodiments a third-party property may be a grocery store, a convenience store, a fuel station, food service establishments, retail stores, offices, theatres, or any other appropriate venue for user food service pick up.

In some embodiments, a trending drop-off location may be generated by a single user ordering a very large number of orders for multiple people that may not be authenticated by the system. For example, an office administrator may create an order for the lunch of their office workers. The office administrator may create the order and send requests for the food service menu selection and payment to each individual the office administrator invites to be part of the order. The office administrator may further set a desired drop-off time and view the completed orders of their office workers. In some embodiments, when the office administrator submits the order, all the orders of the office workers are merged into a merged order having a single drop-off location.

At block 306, the computing system 100 may select from the collection of registered users, a subset of those users. In some embodiments, the selection of the subset of users may be based on the drop-off time, the trending drop-off location, a current location of the user, and an order history of the user. For example, when the trending pick-up location is determined, customer order history may indicate users most likely to order from the food service establishment near the trending pick-up location at this specific time. In some embodiments, a user is registered when the user creates an account which may be stored by customer database 210. In some embodiments, the location of the user may be determined based on user input or indicated by the remote device 148 of the user. In some embodiments, the remote device 148 of the user may contain a GPS circuit or other wireless communication circuits capable of determining the position of the user.

At block 308, the computing system 100 may send to the subset of users an incentive to place an order. For example, the incentive may include a discount on the cost of the order, a complimentary menu item, a discount on future orders, waiving of fees, a quicker delivery time, or any suitable incentive to place an order. In some embodiments the incentive offer is provided with a unique code that must be entered by the user, or automatically, in order to become eligible for the incentive. In some embodiments the code may be generated by unique code generator 212.

Figure 4:
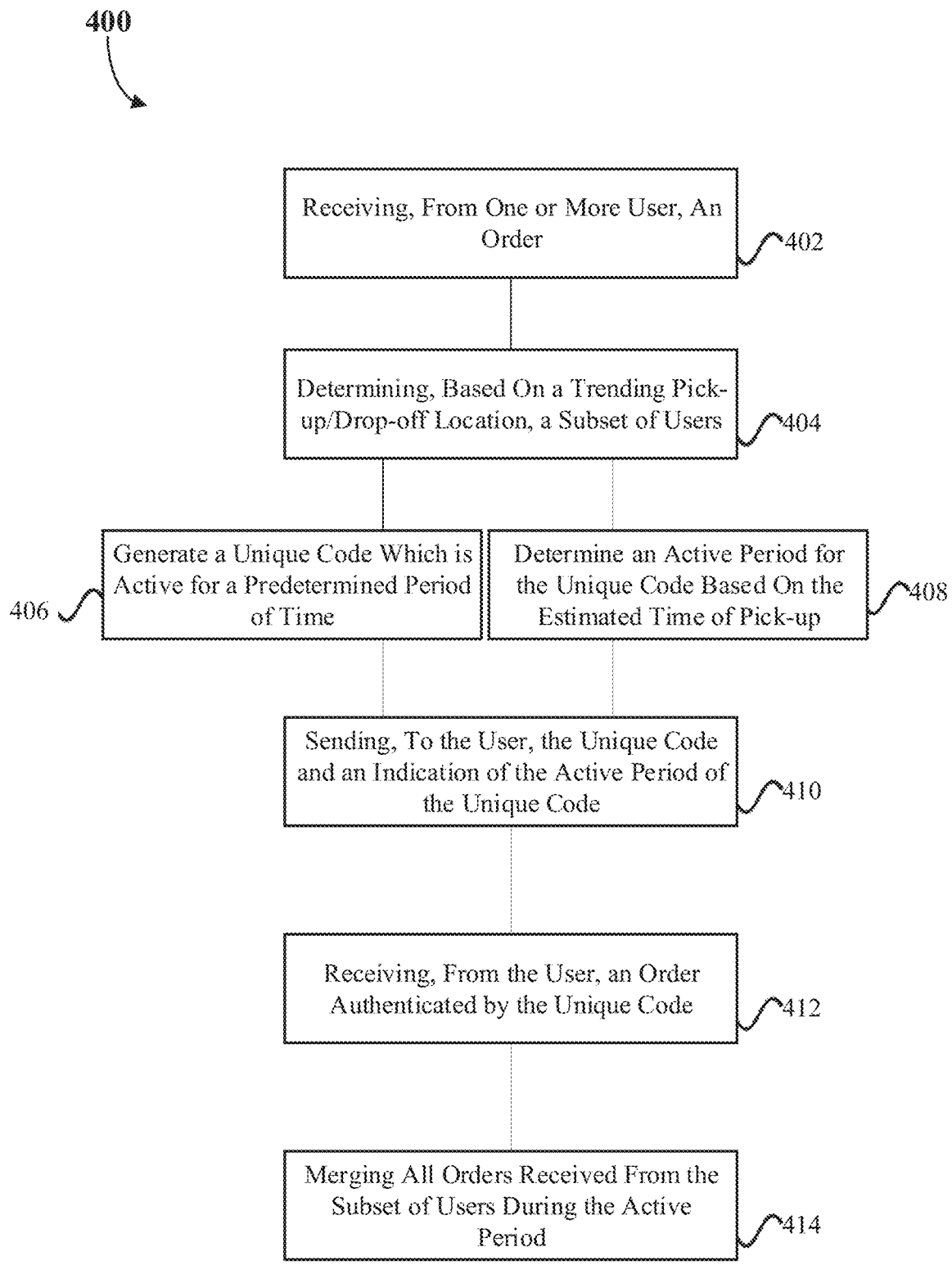
FIG. 4 generally illustrates a flow chart representing the method for receiving and processing orders from users according to the principles of the present disclosure.

FIG. 4 generally illustrates an example embodiments of a method 400 for receiving and processing orders from users according to the principles of the present disclosure. In some embodiments the method 400 may be executed by the processor 104. In some embodiments, instructions to execute the method 400 may be stored in the storage device 124 of the computing system 100. User input may be accepted from the input device 132. In certain implementations, the method 300 may be performed by a single processing thread. Alternatively, the method 400 may be performed by two or more processing threads, each thread implementing one or more individual functions, routines, subroutines, or operations of the methods.

At block 402, the computing system 100 may receive one or more orders from one or more users. In some embodiments, the order may comprise a pick-up location, a drop-off location, and an estimated time of pick-up, an estimated time of drop-off, and a menu selection. In some embodiments, the user may submit an order on one of the remote devices 148 via a web site, an application, a text message, a voice chat interface, an email, or any suitable manner of entering an order. In some embodiments, the order may be tracked by order tracker 206. In some embodiments, information related to the order may be stored by the activity history 208 and the customer database 210.

In some embodiments, the trending drop-off location may be an apartment building, a dormitory, a banquet hall, a multipurpose space, a convention center, a conference room, or a location intended to be used for a food service pick-up location. For example, if a trending number of order arrive within a predetermined time and at a predetermined rate, a dormitory may be a trending drop-off location. The food service orders of the customers may be dropped off at the trending drop-off location and picked up by the requisite users. In another example, a trending drop-off location may be property of a third party with whom a license may exist allowing their property to be used as a trending drop-off location. In some embodiments a third party property may be a grocery store, a convenience store, a fuel station, food service establishments, retail stores, offices, theatres, or any other appropriate venue for user food service pick up.

At block 404, the computing system 100 may determine that the orders may be associated with a trending pick-up location and attempt to add additional orders associated with the pick-up location. Based on customer activity history and proximity to the pick-up location, the method 400 may select a subset of users from the total pool of registered users. In some embodiments, the customer activity history may be access from activity history 208. In some embodiments, the pool of registered users may be accessed from the customer database 210.

At block 406, the computing system 100 may generate a unique code associated with an incentive offer for each user in the subset of users. In some embodiments, the code may be generated by the unique code generator 212. In some embodiments, the unique code is available for a limited time, that time being related to the predetermined timing information associated with the trending pick-up location. For example, a user of the subset of users may receive an incentive to place an order at a food service establishment associated with the trending pick-up location.

At block 408, the computing system 100 may generate or update a timing associated with the trending pick-up location. In some embodiments the timing information may be determined based on number of orders and the rate at which orders are received when compared with a threshold of orders received within a predetermined amount of time. In some embodiments, the threshold of received orders and the predetermined amount of time may be determined based on historical trends and inputs from system administrators. The timing restriction associated with the unique code generated for the user incentive may encourage users to make their orders at the same/similar times to or from a single location. Such orders may increase the number of orders that may be handled by a smaller number of drivers; thereby reducing costs.

At block 410, the computing system 100 may send the incentive offer to the subset of users, having a unique code and an indication of the timing restriction associated with the incentive offer. For example, a user may be required to enter their order for a specific restaurant within the timing restriction in order to be eligible for the incentive. In another example, a user may receive an incentive based on a trending drop-off location and is only restricted based on the timing element in order to be eligible for the incentive offer.

At block 412, the computing system 100 may receive from the user an order and a unique code associated with the user within the timing restriction of the offer. In some embodiments the computing system 100 may determine if the user is eligible for the offer. Once confirmed, the method 400 accepts the order of the user and provides the incentive. For example, the incentive may comprise a discount on the cost of the order, a complimentary menu item, a discount on future orders, waiving of fees, a quicker delivery time, or any suitable incentive to place an order.

At block 414, the computing system 100 may merge all the order received from the trending drop-off and/or pick-up location. In some embodiments the computing system 100 may generate a merged order based on all the orders received related to the trending drop-off and/or pick-up location during the associated timing restriction. For example, the cooking staff of a food service establishment may receive a single order representing the menu selections of all of the subset of users that chose that specific food service establishment for their order. More than one food service establishment may be associated with a single trending pick-up location. The merged order for the food service establishment may comprise all menu selections of the users, at least one trending pick-up location, and the associated users.

Figure 5:
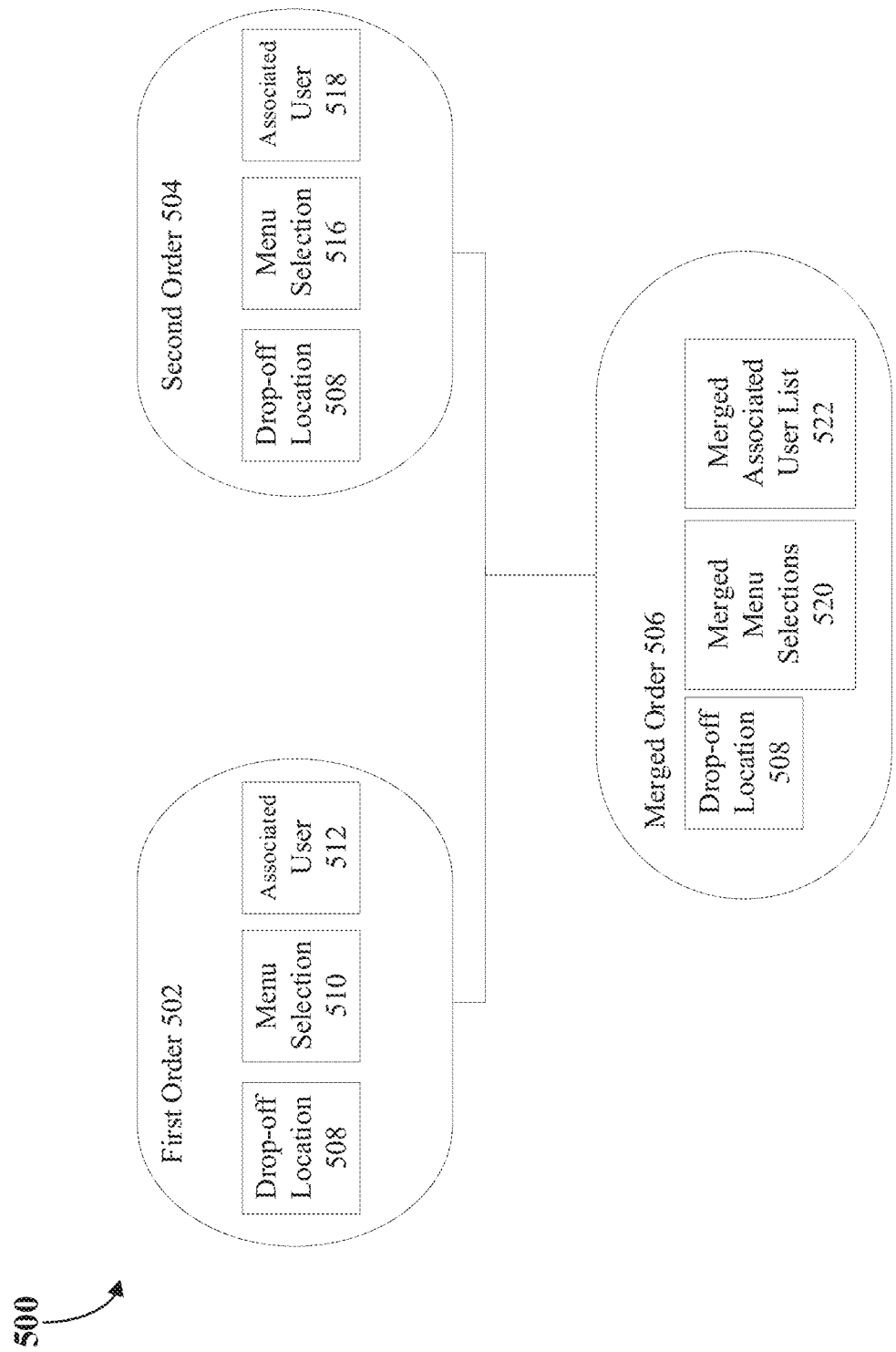
FIG. 5 generally illustrates a block diagram of merging orders from multiple users into a merged order according to the principles of the present disclosure.

FIG. 5 generally illustrates a block diagram of computing environment 500 for merging orders from multiple users into a merged order according to the principles of the present disclosure. For the purpose of simplicity, only two orders are shown but this not intended to limit the scope of the system. Many orders may merged into one or more merged orders. In some embodiments, the computing system 100 may merge the orders, however, third party servers 222, and restaurant servers 226 may also assist or perform the merge the orders. In some embodiments the computing environment 500 is executed by processor 104.

In some embodiments, an order may comprise a drop-off location 508, a menu selection 510, and an associated user. Computing environment 500 comprises two orders, First order 502 and Second order 504. First order 502 comprises a drop-off location 508, a menu selection 510, and an associated user 512. Second order 504 comprises the same drop-off location 508 as the first order 502, but its own unique menu selection 516 and associated user 518. In some embodiments, the pick-up location may also be similar from order to order and is stored with the order. Depending on whether there is a trending pick-up location, a trending drop-off location, or both, may affect the components of the orders.

In some embodiments, the merged order 506 may be generated based on the first order 502 and the second order 504. In some embodiments, the merged order 506 may comprise drop-off location 508, merged menu selections 520, and merged associated user list 522. The merged menu selection 520 having all menu selections associated with a trending pick up location.

In some embodiments, multiple food service establishments may be associated with a trending pick-up location. Therein, a merged order will be created for each food service establishment having the merged menu selections 520 comprise all menu items from all users having ordered food items associated with that food service establishments. In some embodiments, users may order multiple menu selections from multiple food service establishments which generates multiple merged orders, one for each food service establishment.

Figure 6:
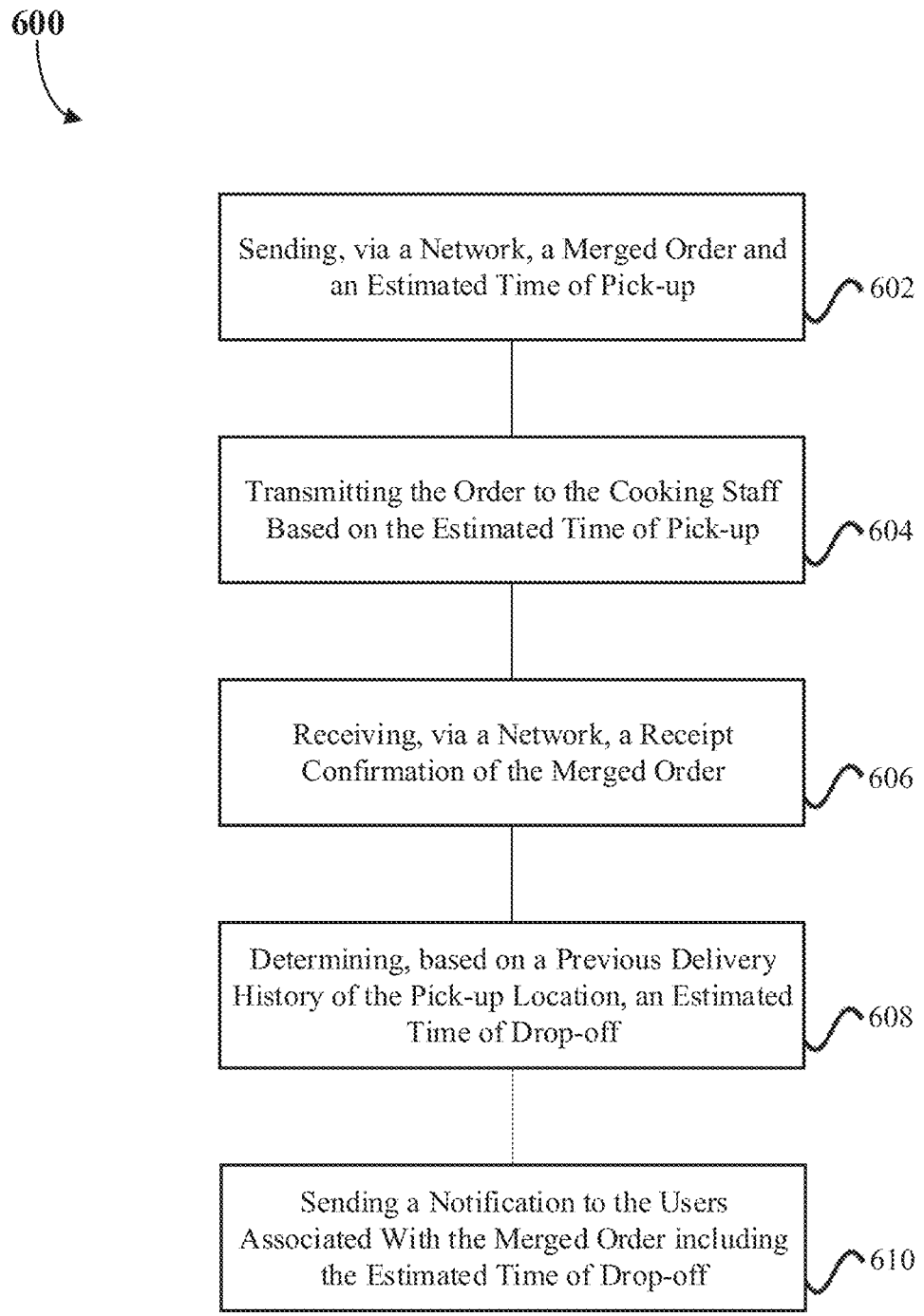
FIG. 6 generally illustrates a flow chart representing the method for notifying users regarding their order according to the principles of the present disclosure.

FIG. 6 generally illustrates an example embodiment of a method 600 for notifying users regarding their order according to the principles of the present disclosure. In some embodiments the method 600 may be executed by the processor 104. In some embodiments, instructions to execute the method 600 may be stored in the storage device 124 of the computing system 100. User input may be accepted from the input device 132. In certain implementations, the method 600 may be performed by a single processing thread. Alternatively, the method 600 may be performed by two or more processing threads, each thread implementing one or more individual functions, routines, subroutines, or operations of the methods.

At block 602, the computing system 100 may send a merged order and an estimated pick-up time to a food service establishment. In some embodiments the merged order and estimated pick-up time may be received by restaurant server 226, or the restaurant server 226 may receive individualized orders and merge them onsite. In some embodiments, the order may be merged in the manner illustrated by computing environment 500.

At block 604, the computing system 100 may transmit the order to the cooking staff of a food service establishment. In some embodiments, the timing of the transmission to the cooking staff may be based on the estimated pick-up time. In some embodiments the estimated pick-up time may be estimated based on status of the driver, current location of the driver, the history of the driver, current traffic conditions, historical traffic conditions, weather conditions, and any suitable metric to determine time of arrival of the driver to the food service establishment.

At block 606, the computing system 100 may receive a receipt confirmation of the merged order. In some embodiments, the receipt confirmation may be sent by the restaurant server 226. For example, a user may input an order from a trending pick-up location associated with the food service establishment, to ensure receipt of the order due to holidays, inattentive staff, business hours, technical difficulties, or any valid reason.

At block 608, the computing system 100 may determine an estimated time of drop-off. In some embodiments, the estimated time of drop-off may be generated based in part on the previous delivery history associated with the pick-up location, distance between the pick-up location and the drop-off location, other stops required by the driver, the previous delivery history associated with that driver, weather conditions, current traffic conditions, historical traffic conditions, weather conditions, and any suitable metric to determine time of arrival of the driver to the user.

At block 610, the computing system 100 may send a notification to the users associated with the merged order including the estimated time of drop-off. In some embodiments, the notification may be a push notification sent to the remote device 148 which may be associated with the user who made the order. In some embodiments, the notification can be one of a text message, email, voice chat, instant message, phone call, or any suitable manner of alerting the user to the notification. In some embodiments, the notification may contain a link to an interface which displays the current status of the order. In some embodiments, the current status interface may update in real-time and provide estimated drop-off times based on the most up to date information available. In some embodiments a further notification which may be sent to the user when the driver confirms delivery of the order.

Clauses:

Clause 1 A method for incentivizing logistically convenient delivery orders, the method comprising:
monitoring, by a computing device, delivery orders of users which include a pick-up location, a drop-off location, an estimated time of pick-up, and an estimated time of drop-off;
determining, based on the monitoring of delivery orders, a trending drop-off location and a trending drop-off time;
determining, based on the trending drop-off location, the trending drop-off time, and a current location of the users, a subset of users; and
sending to the subset of users an incentive to place a delivery order.

Clause 2 The method of any clause herein, wherein the subset of users is selected from the users based in part on a location of the user being similar to the trending drop-off location.

Clause 3 The method of any clause herein, wherein the subset of users is selected from the users based in part on previous delivery history of a user indicating an affinity for an order from a trending pick-up location.

Clause 4 The method of any clause herein, wherein the subset of users is selected from the users based in part on an incentive acceptance history.

Clause 5 The method of any clause herein, wherein the incentive to place a delivery order for each of the subset of users is related to a unique code available to a specific user and available for a predetermined amount of time.

Clause 6 The method of any clause herein, wherein the estimated time of drop-off is determined based in part on a previous delivery history related to a previous trending drop-off time history and the estimated time of pick-up is determined based in part on the previous delivery history related to the previous trending pick-up time history.

Clause 7 The method of any clause herein, further comprising:
receiving, from at least two users of the subset of users, an order from each user;
generating, based on the two or more orders, a merged order.

Clause 8 The method of any clause herein, wherein an order comprises a drop-off location, a menu selection, and an associated user; and
wherein the merged order comprises one drop-off location, at least two menu selections, and at least two associated users.

Clause 9 A non-transitory computer-readable storage medium encoded with computer-executable instructions, that when executed by a device, cause the processor to:
monitor, by a computing device, delivery orders of users which include a pick-up location, a drop-off location, an estimated time of pick-up, and an estimated time of drop-off;
determine, based on the monitoring of delivery orders, a trending drop-off location and a trending drop-off time;
determine, based on the trending drop-off location, the trending drop-off time, and a current location of the users, a subset of users; and
send to the subset of users an incentive to place a delivery order.

Clause 10 The non-transitory computer-readable storage medium of any clause herein, wherein the subset of users is selected from the users based in part on a location of the user being similar to the trending drop-off location and a previous delivery history of a user indicating an affinity for an order from a trending pick-up location.

Clause 11 The non-transitory computer-readable storage medium of any clause herein, wherein the incentive to place a delivery order for each of the subset of users is related to a unique code available to a specific user and available for a predetermined amount of time.

Clause 12 The non-transitory computer-readable storage medium of any clause herein, wherein the estimated time of drop-off is determined based in part on a previous delivery history related to a previous trending drop-off time history and the estimated time of pick-up is determined based in part on the previous delivery history related to the previous trending pick-up time history.

Clause 13 The non-transitory computer-readable storage medium of any clause herein, further comprising:
receiving, from at least two users of the subset of users, an order from each user;
generating, based on the two or more orders, a merged order.

Clause 14 The non-transitory computer-readable storage medium of any clause herein, wherein an order comprises a drop-off location, a menu selection, and an associated user; and
wherein the merged order comprises one drop-off location, at least two menu selections, and at least two associated users.

Clause 15 A device having a processor and a non-transitory computer-readable medium encoded with instructions that, when executed by the processor, cause the processor to:
monitor, by a computing device, delivery orders of users which include a pick-up location, a drop-off location, an estimated time of pick-up, and an estimated time of drop-off;
determine, based on the monitoring of delivery orders, a trending drop-off location and a trending drop-off time;

determine, based on the trending drop-off location, the trending drop-off time, and a current location of the users, a subset of users; and send to the subset of users an incentive to place a delivery order.

Clause 16 The device of any clause herein, wherein the subset of users is selected from the users based in part on a location of the user being similar to the trending drop-off location and a previous delivery history of a user indicating an affinity for an order from a trending pick-up location.

Clause 17 The device of any clause herein, wherein the incentive to place a delivery order for each of the subset of users is related to a unique code available to a specific user and available for a predetermined amount of time.

Clause 18 The device of any clause herein, wherein the estimated time of drop-off is determined based in part on a previous delivery history related to a previous trending drop-off time history and the estimated time of pick-up is determined based in part on the previous delivery history related to the previous trending pick-up time history.

Clause 19 The device of any clause herein, further comprising:
receiving, from at least two users of the subset of users, an order from each user;
generating, based on the two or more orders, a merged order.

Clause 20 The device of any clause herein, wherein an order comprises a drop-off location, a menu selection, and an associated user; and
wherein the merged order comprises one drop-off location, at least two menu selections, and at least two associated users.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The various aspects, embodiments, implementations, or features of the described embodiments can be used separately or in any combination. The embodiments disclosed herein are modular in nature and can be used in conjunction with or coupled to other embodiments.

Consistent with the above disclosure, the examples of assemblies enumerated in the following clauses are specifically contemplated and are intended as a non-limiting set of examples.

What is claimed is:

1. A method for incentivizing logistically convenient delivery orders, the method comprising:
   monitoring, by a computing device, delivery orders of users which include a pick-up location, a drop-off location, an estimated time of pick-up, and an estimated time of drop-off;
   determining, based on the monitoring of delivery orders, a trending drop-off location and a trending drop-off time;
   determining, based on the trending drop-off location, the trending drop-off time, and a current location of the users, a subset of users; and
   sending to the subset of users an incentive to place a delivery order.

2. The method of claim 1, wherein the subset of users is selected from the users based in part on a location of the user being similar to the trending drop-off location.

3. The method of claim 1, wherein the subset of users is selected from the users based in part on previous delivery history of a user indicating an affinity for an order from a trending pick-up location.

4. The method of claim 1, wherein the subset of users is selected from the users based in part on an incentive acceptance history.

5. The method of claim 1, wherein the incentive to place a delivery order for each of the subset of users is related to a unique code available to a specific user and available for a predetermined amount of time.

6. The method of claim 1, wherein the estimated time of drop-off is determined based in part on a previous delivery history related to a previous trending drop-off time history and the estimated time of pick-up is determined based in part on the previous delivery history related to the previous trending pick-up time history.

7. The method of claim 1, further comprising:
   receiving, from at least two users of the subset of users, a first order and a second order; and
   generating, based on the first order and second order, a merged order.

8. The method of claim 7, wherein an order comprises a drop-off location, a menu selection, and an associated user; and
   wherein the merged order comprises one drop-off location, at least two menu selections, and at least two associated users.

9. A non-transitory computer-readable storage medium encoded with computer-executable instructions, that when executed by a device, cause a processor to:
   monitor, by a computing device, delivery orders of users which include a pick-up location, a drop-off location, an estimated time of pick-up, and an estimated time of drop-off;
   determine, based on the monitoring of delivery orders, a trending drop-off location and a trending drop-off time;
   determine, based on the trending drop-off location, the trending drop-off time, and a current location of the users, a subset of users; and
   send to the subset of users an incentive to place a delivery order.

10. The non-transitory computer-readable storage medium of claim 9, wherein the subset of users is selected from the users based in part on a location of the user being similar to the trending drop-off location and a previous delivery history of a user indicating an affinity for an order from a trending pick-up location.

11. The non-transitory computer-readable storage medium of claim 9, wherein the incentive to place an order for each of the subset of users is related to a unique code available to a specific user and available for a predetermined amount of time.

12. The non-transitory computer-readable storage medium of claim 9, wherein the estimated time of drop-off is determined based in part on a previous delivery history related to a previous trending drop-off time history and the estimated time of pick-up is determined based in part on the previous delivery history related to the previous trending pick-up time history.

13. The non-transitory computer-readable storage medium of claim 9, further comprising:
   receiving, from at least two users of the subset of users, a first order and a second order; and
   generating, based on the first order and a second order, a merged order.

14. The non-transitory computer-readable storage medium of claim 13, wherein an order comprises a drop-off location, a menu selection, and an associated user; and
   wherein the merged order comprises one drop-off location, at least two menu selections, and at least two associated users.

15. A device having a processor and a non-transitory computer-readable medium encoded with instructions that, when executed by the processor, cause the processor to:
   monitor, by a computing device, delivery orders of users which include a pick-up location, a drop-off location, an estimated time of pick-up, and an estimated time of drop-off;
   determine, based on the monitoring of delivery orders, a trending drop-off location and a trending drop-off time;
   determine, based on the trending drop-off location, the trending drop-off time, and a current location of the users, a subset of users; and
   send to the subset of users an incentive to place a delivery order.

16. The device of claim 15, wherein the subset of users is selected from the users based in part on a location of the user being similar to the trending drop-off location and a previous delivery history of a user indicating an affinity for an order from a trending pick-up location.

17. The device of claim 15, wherein the incentive to place an order for each of the subset of users is related to a unique code available to a specific user and available for a predetermined amount of time.

18. The device of claim 15, wherein the estimated time of drop-off is determined based in part on a previous delivery history related to a previous trending drop-off time history and the estimated time of pick-up is determined based in part on the previous delivery history related to the previous trending pick-up time history.

19. The device of claim 15, further comprising:
   receiving, from at least two users of the subset of users, a first order and a second order; and
   generating, based on the first order and second order, a merged order.

20. The device of claim 19, wherein an order comprises a drop-off location, a menu selection, and an associated user; and
   wherein the merged order comprises one drop-off location, at least two menu selections, and at least two associated users.

\* \* \* \* \*